United States Patent
Melgaard et al.

(10) Patent No.: US 6,911,146 B2
(45) Date of Patent: Jun. 28, 2005

(54) REMOVABLE FILTERS AND WATER HEATING VESSELS INCORPORATING SUCH

(75) Inventors: Klaus Melgaard, Hastings (GB); Simon M. Whiteley, Buxton (GB)

(73) Assignee: Koninklijke Philips Electronics, N.V., Eindhoven (NL)

(*) Notice: Subject to any disclaimer, the term of this patent is extended or adjusted under 35 U.S.C. 154(b) by 439 days.

(21) Appl. No.: 09/455,664

(22) Filed: Dec. 7, 1999

(65) Prior Publication Data

US 2002/0070156 A1 Jun. 13, 2002

(30) Foreign Application Priority Data

Dec. 10, 1998 (GB) .............................................. 9827181

(51) Int. Cl.⁷ .............................................. B01D 35/02
(52) U.S. Cl. ...................... 210/316; 210/317; 210/468; 210/482; 210/499; 210/510.1; 222/189.07; 222/189.08
(58) Field of Search ................................ 210/467–468, 210/469, 473, 282, 263, 266, 283, 316, 317, 323.1, 335, 339, 510.1, 307, 499, 495, 496, 508, 494.2, 466, 483, 488–489, 482; 99/317, 322, 323, 288, 289; 426/77; 222/189.06–189.08, 189.11

(56) References Cited

U.S. PATENT DOCUMENTS

| | | | | |
|---|---|---|---|---|
| RE3,462 | * | 5/1869 | Simons | |
| 427,568 A | * | 5/1890 | Halstead | |
| 652,413 A | * | 6/1900 | Waliingford et al. | |
| 790,052 A | * | 5/1905 | Dalton et al. | ............ 222/189.07 |
| 866,796 A | * | 9/1907 | Martindale | ............ 222/189.07 |
| 915,324 A | * | 3/1909 | Baily | |
| 1,248,114 A | * | 11/1917 | Hershey | |
| 1,731,698 A | * | 10/1929 | Anderson | |
| 2,183,773 A | * | 12/1939 | Lehman | |
| 2,781,312 A | * | 2/1957 | Klumb et al. | |
| 5,652,008 A | * | 7/1997 | Heiligman | |
| 6,383,381 B1 | * | 5/2002 | O'Flynn et al. | ............ 210/232 |

FOREIGN PATENT DOCUMENTS

| | | | | |
|---|---|---|---|---|
| GB | 2251547 | * | 7/1992 | |
| GB | 2251547 A | * | 7/1992 | |
| GB | 2261362 A | * | 5/1993 | |
| GB | 2251547 R | | 6/1993 | ............ A47J/27/21 |
| GB | 2268680 A | * | 1/1994 | |
| GB | 2280596 A | * | 2/1995 | |
| GB | 2284563 | * | 6/1995 | |
| JP | 58-064178 A | * | 4/1983 | |
| JP | 3-277312 A | * | 12/1991 | |
| JP | 07-024227 A | * | 1/1995 | |
| US | WO 00/23167 A | * | 4/2000 | |
| WO | 95/13733 | * | 5/1995 | |

OTHER PUBLICATIONS

Derwent Abstract of JP 58–064178 A (in English), pp. 1–2.*
Derwent Abstract of JP 07–024227A (in English) p. 1.*
Derwent Abstract of JP 3–277321A.*
Patent Abstracts of Japan, Pub. No. 03277321, Pub. Date Sep. 12, 1991, App. Date Mar. 28, 1990, App. No. 02079725, App. Toshiba Corp; Inf. Cl. A47J 27/21, Title: Hot–Water Supply Device.
Patent Abstracts of Japan, Pub. No. 08010163, Pub. Date Jan. 16, 1996, App. Date Jun. 30, 1994, App. No. 06149217 App. Matsushita Electric Ind Co Ltd. Int. Cl. A47J 27/21 Title: Electric Water Heater.

* cited by examiner

*Primary Examiner*—Terry K. Cecil

(57) ABSTRACT

A filter (10) for use in a water heating vessel, such as an electric kettle, to filter sedimentary material in the water includes a scale collector (25), for example in the form of a compacted mesh block, carried on the filter. The block can be supported by a carrier member (27) permanently or detachably mounted on the filter frame, preferably towards an end of the filter closest to the bottom of the vessel.

10 Claims, 4 Drawing Sheets

REMOVABLE FILTERS AND WATER HEATING VESSELS INCORPORATING SUCH

BACKGROUND OF THE INVENTION

The present invention relates to removable filters for use in water heating vessels such as electric water kettles, coffee makers, and the like.

Removable filters for use in water kettles for removing scale and the like are known, examples of such for use in electric water kettles being described in GB-B-2251547. A filter disclosed therein consists of a plastics frame having windows covered by fine filter mesh which is positioned within the water-containing body of the kettle overlying the output spout so that water heated in the kettle passes through the mesh of the filter when being poured out through the spout. The interior of the kettle body and the frame of the filter are provided with cooperating engagement means for removably mounting the filter in the kettle in sealing manner. This enables the filter to be slid into, and retained in, the kettle body in the desired position and also enables the easy removal of the filter by reverse action for cleaning or replacement purposes. In use, the mesh of the filter prevents the passage through the spout of particulate and sedimentary materials, and especially scale (generally calcium carbonate) produced when boiling water which can lead to a scum being formed on the surface of the water, particularly when the kettle body is formed of a plastics material since the extent of metal surfaces, to which such has a tendency to adhere, is then less. Thus, undesired sedimentary material is trapped within the kettle. The filter can be periodically removed and washed to remove accumulated scum and sediment material and the interior of the kettle similarly rinsed to remove loose material. Over a period of time, which is dependent on the hardness of the water used, scale may form on the filter mesh causing clogging but then the filter can readily be removed and replaced by a fresh unit.

Such a filter has proved to be effective in preventing scum and particulate material being poured out with the water. However, scale will continue to be formed on interior surfaces of the kettle body which in the case of kettles with bodies of plastics material will usually be the surfaces of metal components, such as an immersion heater element or an exposed metal bottom wall surface to which a concealed type electric heating element is fixed, since scale appears to form much more readily on metal surfaces rather than the plastics materials commonly used for the kettle bodies. Accumulated scale formation on the heating element or bottom metal plate not only looks unsightly but can also impair the operational effectiveness of the heating element.

It has been known also for some time to use in water kettles a scale collector comprising a body of stainless-steel wire or mesh compacted into the form of a small ball-like block which is simply dropped into the kettle and which serves as a scale attractor or precipitator upon which scale is encouraged to form rather than other metal components such as the element. However, movement of this block within the kettle body can cause damage through scratching and abrasion to the element and wall surfaces of the kettle body, and the mesh of a filter if fitted. If a filter is not fitted, the block may even obstruct the spout and prevent the free flow of water therethrough.

SUMMARY OF THE INVENTION

It is one object of the present invention to provide an improved form of replaceable filter for use in a water heating vessel.

According to a first aspect of the present invention, a filter for use in a water heating vessel for filtering sedimentary material in the water is characterised in that the filter has a scale collector attached to its structure. Thus, the filter and scale collector are integrated together as a single, replaceable, item. The combination of the scale collector with the filter in this manner offers a number of advantages. Besides being easily replaceable together with the filter, the scale collector is fixed to the filter and cannot, therefore, cause abrasions or other damage to the element, filter mesh, or body wall surfaces. Because the scale collector is in close proximity to the filter then increased life, and efficiency, of the scale filter mesh could be expected. Moreover, the scale collector can now be formed of plastics mesh as well as metal mesh since it is mounted on the filter and consequently there is no longer a risk of the collector touching the element, or a surface in direct contact with the element, and melting.

The scale collector could be attached to the filter structure in various ways but preferably is supported by a carrier member on the frame of the filter which carrier member may be permanently mounted on the frame or detachably mounted to allow replacement of the scale collector together with the carrier member. Alternatively, the scale collector may be removably mounted to the carrier member to permit replacement separately.

The scale collector can be in the form of a block of compacted mesh, for example, of steel or plastics material, and the block may have a bore through which a part of the carrier member extends allowing the block to rotate around that part to facilitate periodic cleaning of the block if required by brushing without having to remove the block from the carrier member.

Preferably, the scale collector is situated on the filter away from the filter mesh material of the filter and towards one end of the filter which in use of the filter in a water heating vessel is closest to the bottom of the vessel.

According to a second aspect of the present invention, there is provided a water heating vessel, such as a kettle, including a filter in accordance with the first aspect of the invention removably mounted within the vessel and extending over a water output of the vessel.

BRIEF DESCRIPTION OF THE DRAWINGS

Embodiments of filters and kettles using such in accordance with the invention will now be described, by way of example, with reference to the accompanying drawings, in which.

It will be appreciated that the Figures are merely simplified schematic drawings and are not to scale.

DESCRIPTION OF THE PREFERRED EMBODIMENTS

Figure 1:
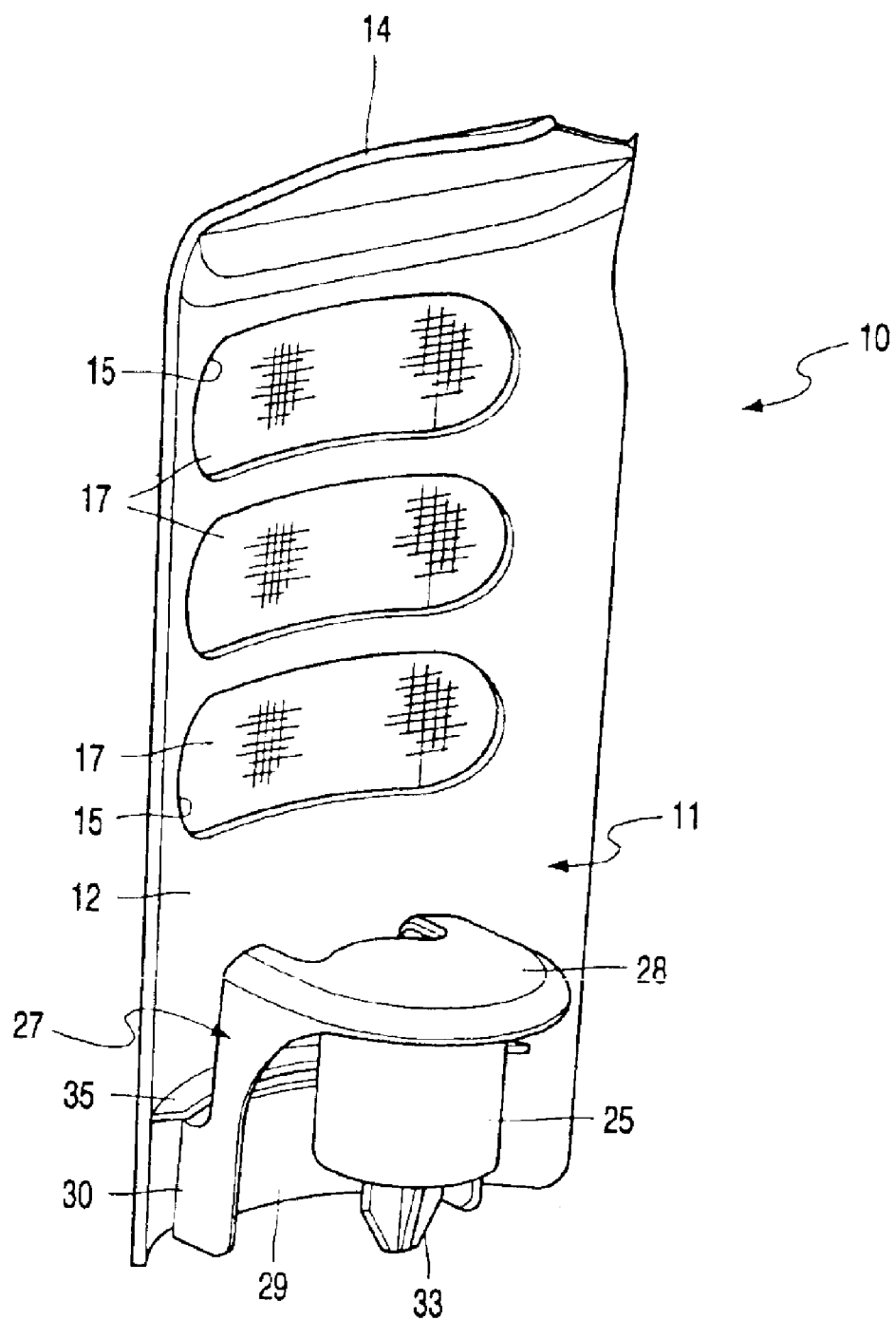
FIGS. 1 and 2 are schematic perspective views from above and below of a first embodiment of filter according to the invention.
Figure 2:
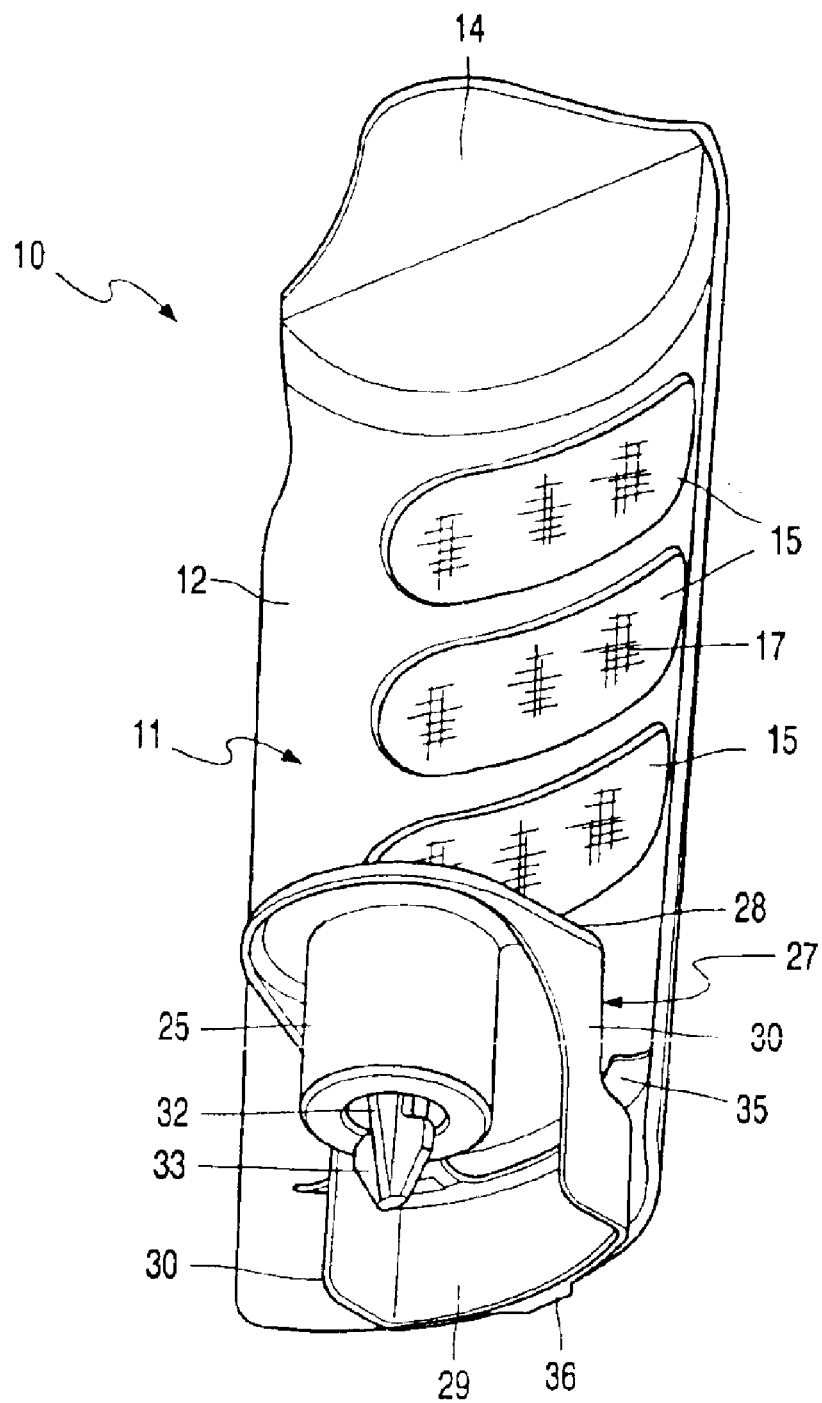
Figure 3:
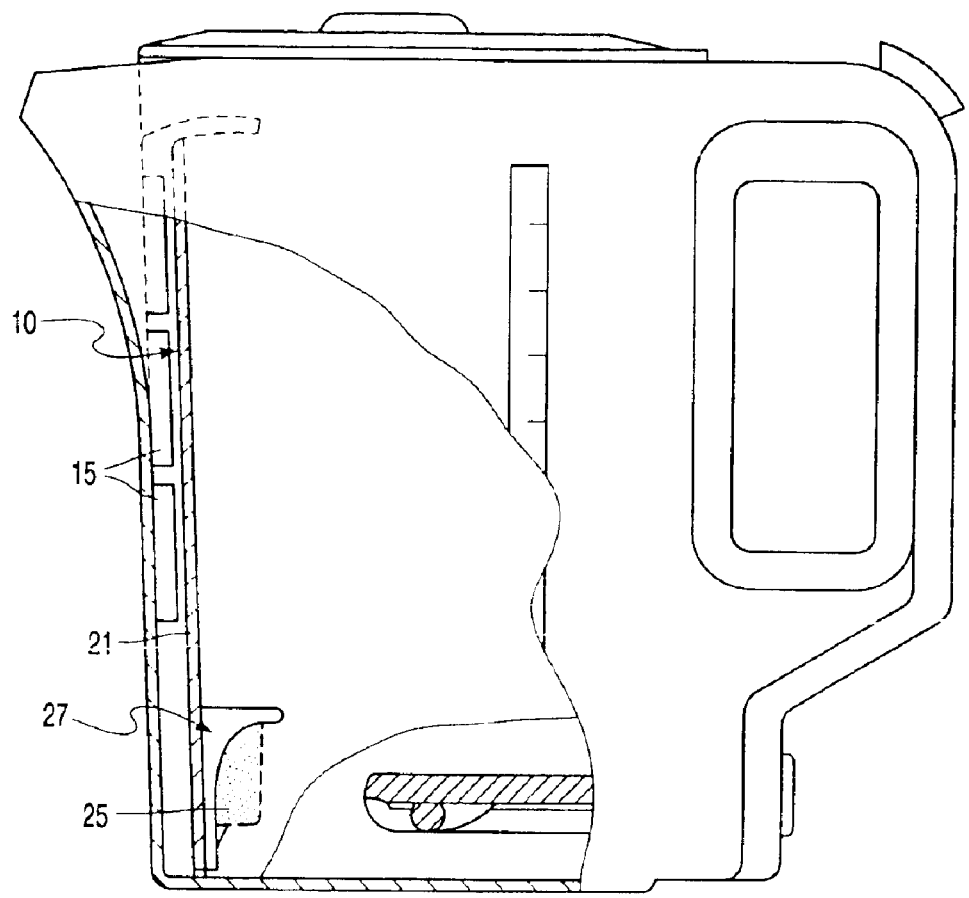
FIG. 3 is a part sectional side view of a kettle showing the filter of FIGS. 1 and 2 mounted therein.

Referring to FIGS. 1 and 2, certain features of the filter shown are generally similar to those described in GB-B-2251547 to which reference is invited. Thus, the filter, 10, comprises a supporting frame structure 11 consisting of a single piece of plastics moulding, for example of polypropylene, having a generally rectangular curved main wall 12 and an outwardly projecting upper end wall 14 which enables the filter to be gripped manually when inserting or extracting the filter from a kettle and serves also as a baffle plate preventing water flowing over the top of the filter when being poured from a kettle. The main wall 12 has a window in its upper region which is separated into three individual portions 15 by integral transverse ribs each of which portions is covered by nylon filter mesh 17, with pores of around 50 µm diameter, secured in the frame during moulding. Referring to FIG. 3, which shows a typical form of jug-kettle with a plastics body, for example of an acetal copolymer or polypropylene, defining a water chamber, the filter is positioned in the kettle extending vertically over a substantial part of the sidewall of the kettle body and overlying the spout so that heated water poured from the kettle passes through the filter mesh material 17. The filter 10 is located and retained in this position by means of opposing ribs 21 formed integrally with the sidewall of the kettle body which extend over a greater part of its height and which cooperate in a sealing manner with the longitudinal side edges of the filter frame to enable the filter to be slid downwardly into the kettle body, until its bottom edge rests against, or close to, the bottom wall of the kettle body, and removed by sliding in the opposite direction. The features of the filter described thus far are generally similar to the known form of filter.

At the lower end of the filter structure, a scale collector is attached. In this embodiment, the scale collector consists of a block 25 of stainless steel wire mesh compacted into a generally cylindrical form, having a central bore, which is supported on a carrier member 27 that is fixed to the filter frame 11 at the lower end of the wall 12. The scale collector block together with the carrier member form a scale collector cartridge. The mesh of the block 25 affords a large surface area and acts as a precipator or attractor for scale formation. To some extent, the block serves also as a filter trapping loose scale deposits. The carrier member 27 is a generally open—sided structure of moulded plastics, e.g. polypropylene, comprising an upper wall 28, a curved side wall 29, whose curvature conforms with that of the wall 12, and bridging side arms 30. The upper wall 28 is provided with an integrally formed, downwardly directed, boss extension 32 which passes through the central bore of the block 25 and has flared, arrow-shaped, end part 33 which can be pushed through the block 25, utilising the resilient nature of the mesh material, but which then serves to prevent the block sliding off the extension and to retain the block so that it is fixedly supported on the carrier member 27 while allowing the block to rotate around the extension 32.

The carrier member 27 is in turn fixed to, and supported by, the filter frame 11 by means of a transverse rib 35 formed integrally on the wall 12 which engages with a shoulder on the carrier member between the side wall 29 and the bridging side arms 30 of the carrier member with the surface of the side wall 29 resting against the surface of the wall 12. The lower edge of the side wall 29 carries a tongue 36 which extends around the lower edge of the wall 12 and upwards over the opposite side of this wall in a push-fit manner to clamp the carrier member to the lower part of the wall 12. Thus, the cartridge and filter frame are effectively clipped together.

With this arrangement, the carrier member 27 and the filter frame are secured together in a non-permanent way allowing the carrier member to be detached from the filter frame 11 so that the filter and the scale collector cartridge can be replaced independently if required. Of course, it could be arranged also that the block is held on the carrier member in a releasable fashion allowing the scale collector block 25 to be replaced separately.

The positioning of the carrier member 27 on the filter frame 11 ensures that the scale collector block 25 is located close to the bottom of the kettle body and the level of the heating element. In the example shown in FIG. 3 the heating element comprises a conventional immersion type element. However, the kettle may be of the kind using a concealed heating element or a thick film type heating element in which case the bottom wall of the water heating chamber would normally comprise a plain stainless-steel plate or the like.

Although the particular scale collector block shown here is cylindrical, it will be appreciated that other shapes or forms could be used and that the manner in which it is supported on the carrier member can be varied accordingly. For example, the block could be generally spherical or cube shaped and carried in a cage like structure formed integrally with the carrier member.

A second embodiment of filter according to the invention will now be described with reference to FIGS. 4 and 5 which respectively show a front view of the filter and a perspective view of a scale collector carrier member used in this filter. The filter is similar in many respects to that of the first embodiment except for the scale collector cartridge.

Figure 5:
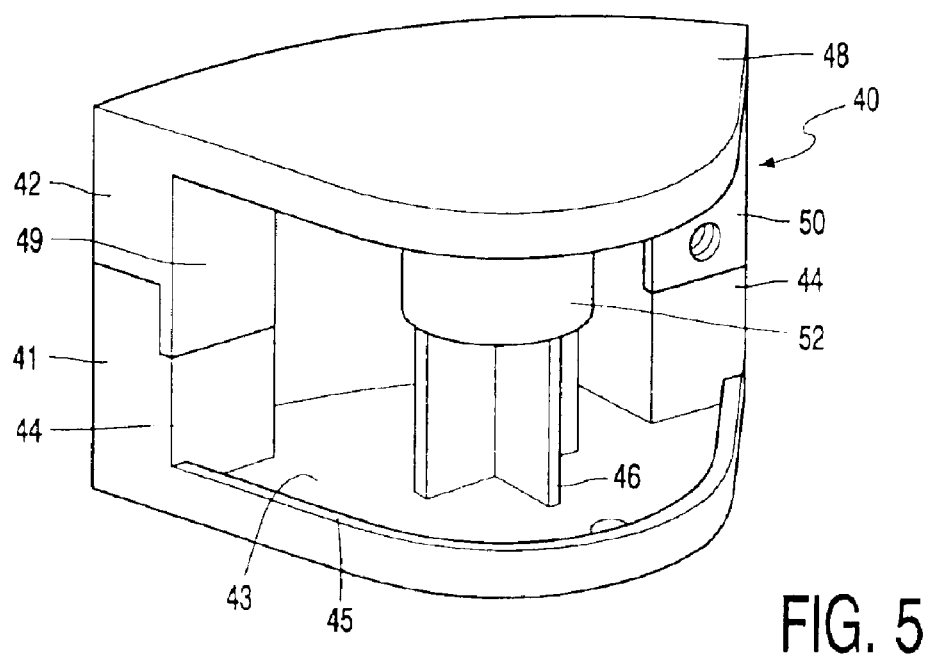
FIG. 5 is a perspective view of cartridge part of the filter of FIG. 4.

Referring to FIG. 5 particularly, the carrier member, 40, for the scale collector block 25 comprises two interlocking parts 41 and 42 of moulded plastics. The lower part 41 consists of a bottom wall 43 with opposed, upstanding, side shoulders 44 and raised peripheral edge 45. It further includes, arranged approximately centrally of the bottom wall 43, an integrally formed cruciform structure 46 projecting upwardly from the base wall.

The upper part 42 consists of a top wall 48, generally co-extensive with the base wall 43, with a side shoulder 49 designed to mate with, and rest snuggly against, the side shoulder 44 of the first part and a projection 50 extending downwardly which is designed and arranged to extend over, and locate in, a cut-out formed in the side shoulder 44. The top wall 48 of the upper part 42 carries approximately centrally a downwardly projecting, integrally—formed, cylindrical boss 52. The cruciform 46 and boss 52 and the parts 41 and 42 respectively are designed to cooperate in a push-fit manner with the cruciform structure extending into the base of the boss 52 to secure the two parts together as shown in FIG. 5. This would normally be done after the scale attracting block 25 has been disposed over the cruciform structure. The block has been omitted from FIG. 5 for clarity but is shown in situ in FIG. 4.

Figure 4:
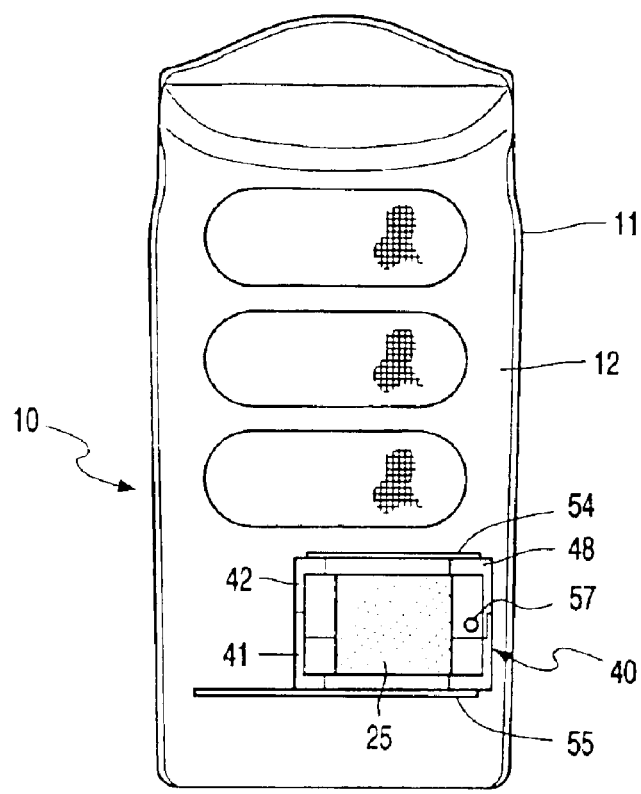
FIG. 4 is a front view of a second embodiment of filter according to the present invention.

The rear surfaces of the carrier member 40 are shaped to conform with the curvature of the wall 12 of the filter frame 11 and the carrier member is positioned on the lower part of this wall by means of transverse ribs 54 and 55, as shown in FIG. 4, formed on the wall 12 which engage with respective edges of the top and bottom walls 43 and 48.

The carrier member 40 is fixed to the filter frame in this position by means of a fixing element, for example a hammer drive screw 57, which passes through aligned holes in the side shoulder 44 and the extension 50 in the upper and lower parts 41 and 42 of the carrier member and into a bore in an integral boss (not visible) projecting outwardly from the surface of the wall 12. The screw 57 thus serves to secure the parts 41 and 42 together as well as to secure the carrier member 40 to the filter frame.

As will be apparent from FIG. 4, the scale collector block 25 in this case is located slightly to one side of the central vertical axis of the filter frame 11 and at a slightly higher level than in the first embodiment but nevertheless would still be close to the level of the heater element at the bottom of the water chamber when fitted in the kettle.

The carrier member in this embodiment is permanently attached to the filter frame and hence both the filter and scale collector cartridge are washable and replaceable as a single item. Again, the form of the block 25 can vary from the particular shape shown.

With regard to both embodiments, the scale collector block serves in operation of the kettle to collect scale deposits, the mesh of the block offering a large surface area upon which scale can form to this end. Since the block 25 is disposed in the carrier member 27 or 40 beneath a top wall of this member the block and scale collected thereby are visibly obscured from the user. The filter and scale collector assembly can readily be removed from the kettle for cleaning, e.g. by rinsing and brushing, and the scale collector block can be rotated within the carrier around its supporting boss to facilitate such cleaning.

The block 25 could be formed of materials other than stainless-steel while still fulfilling its function as a scale precipitator or attractor. For example, a plastics mesh could be used as there is no risk of the block touching the heater element. The scale collector block is located in close proximity to the filter mesh and therefore able to attract and collect scale deposits which otherwise would likely clog the filter mesh. Importantly, as the scale collector block is retained on the filter, the kind of abrasions and damage caused to the element, the filter, and internal wall surfaces of the kettle body by a loose collector block are avoided.

The fabrication of the carrier member and filter frame as separate components enables the same filter frame and mesh assembly to be used with or without a scale collector cartridge as required and may thus be preferred for manufacturing convenience. However, it is envisaged that the carrier member which holds the scale collector block may instead be formed as an integral part of the filter frame, with the frame and carrier member comprising a unitary moulding. Using a mounting arrangement for the block similar to that of the first embodiment then the block can be removed for replacement as necessary by pulling it over the flared end part 33.

Although the above embodiments are described in relation to a kettle of the so-called jug kind and formed of moulded plastics, possibly with a metal bottom wall to its water containing chamber, the filter can of course be used to advantage also in a kettle comprising a metal body, for example of the traditional kind, and in other water heating vessels, such as coffee making machines, and water kettles without electric heating elements intended for use on hobs.

From reading the present disclosure, other modifications will be apparent to persons skilled in the art. Such modifications may involve other features which are already known in the field of water heating vessels such as electric kettles, and filters for use therewith, and which may be used instead of or in addition to features already described herein.

What is claimed is:

1. A filter for use in a water heating vessel for removing sedimentary material, including scale, from the water, wherein the filter comprises a first mesh material provided with a frame and a scale collector, separate from said first mesh material and coupled to the frame, said scale collector comprising a block of compressed mesh material different from said first mesh material and having a surface to which scale is attracted.

2. A filter for use in a water heating vessel according to claim 1, wherein the scale collector member is supported by a carrier member on the frame of the filter.

3. A filter for use in a water heating vessel according to claim 2, characterized in that the carrier member is detachably mounted on the frame.

4. A filter for use in a water heating vessel according to claim 3 wherein the carrier member is situated on a part of the frame away from said first mesh material.

5. A filter for use in a water heating vessel according to claim 2, characterized in that the carrier member is permanently mounted on the frame.

6. A filter for use water heating vessel according to claim 2, characterized in that the scale collector is removably mounted to the carrier member.

7. A filter for use in a water heating vessel according to claim 1, wherein the scale collector is carried on the frame towards an end thereof which in use in a water heating vessel is closest to the bottom of the vessel.

8. A water heating vessel including a filter according to claim 1 removably mounted within the vessel and extending over a water outlet of the vessel.

9. A water heating vessel according to claim 8, characterized in that the water heating vessel comprises a kettle.

10. A filter for use in a water heating vessel for removing sedimentary material, including scale, from the water, wherein the filter comprises a mesh material provided with a frame and a scale collector, separate from said mesh material, comprising a compacted mesh block provided with a bore and supported by a carrier member on the frame of the filter, which carrier member has a part which extends through the bore in the block and around which part the block is rotatable.

* * * * *